United States Patent Office 3,508,929
Patented Apr. 28, 1970

3,508,929
METHOD FOR MAKING CULINARY MIXES
Robert W. Callaghan, Minneapolis, Robert L. Holland, Rosemont, and Robert F. Kozlik and Eugene H. Sander, Minneapolis, Minn., assignors to General Mills, Inc., a corporation of Delaware
No Drawing. Filed Nov. 10, 1966, Ser. No. 593,279
Int. Cl. A21d 2/00, 13/08
U.S. Cl. 99—94                                   14 Claims

ABSTRACT OF THE DISCLOSURE

A premix, comprised of emulsifier coated flour particles, or emulsifier coated flour and sugar particles, which can be used to form a variety of culinary mixes by combining it with other ingredients. The premix is formed by subjecting a mixture of flour and fluid emulsifier, or flour, sugar, and fluid emulsifier to impact forces which fine grind the flour and sugar particles and distribute the emulsifier about the individual particles.

---

The present invention relates to culinary mixes used in making baked products, and more specifically to a method for making an improved culinary premix which can be combined with other ingredients forming the mix, to make improved culinary products. While the premix might be used for making a number of culinary products, it will be described in conjunction with products such as layer cakes.

Prepared mixes formed from ingredients such as flour, sugar, shortening, flavoring, leavening, and the like, are well known in the art. The increased use and popularity of such mixes by the housewife, as well as others, can be attributed at least partly to their convenience and resulting good end product. As is well known, such mixes are combined with an aqueous liquid such as water, plus, in some cases eggs, to make a batter which is then baked. To be successful, the prepared mix must produce a resulting product when baked, which meets the approval of the baker as well as the ultimate consumer.

Prepared mixes are used quite extensively in preparing cakes of various types. There are a number of requisites which a good mix must possess in order to produce a good cake. Among other things, the mix is judged as to its flowability, its general appearance, and the manner in which it develops into a batter, e.g. it should readily combine with the liquid ingredients to form the batter, thereby reducing mixing time and effort. Moreover, it must be able to tolerate the addition of too much or too little liquid when the batter is formed. Oft-times the wrong amount of liquid is either purposely or inadvertently combined with the mix. It has been observed for example, that too much liquid is sometimes added in the mistaken belief that this will add moistness to the baked product. Therefore, the mix should have a high liquid tolerance so that such errors do not degrade the quality of the cake. The batter on the other hand, is often judged as to its texture, consistency, smoothness, and general appearance. As to the baked product, e.g. cake, there are a number of characteristics by which its quality is judged. One such characteristic is its volume, with respect to the amount of mix used. In general, it is desired that the cake have as large a volume as possible without sacrificing other desirable qualities. Another important characteristic by which a cake is judged is the moistness of the cake when baked. In other words, a cake having a dry texture does not generally have as good eating qualities as one in which the exture or "mouth feel" is somewhat moist. Other factors by which a cake may be judged are characteristics regarding its crust, crumb, color, tenderness, and the like.

When making shortening-containing cakes, it is known that the nature and condition of the shortening, and the manner in which it is incorporated into the mix, plays an important part in the leavening process of the cake, and ultimately the volume of the cake. It has been found that it is important that the shortening be dispersed uniformly throughout the mix in order to produce a good cake, and that it should readily combine with the aqueous liquid such as water, when the water is combined with the mix ingredients. Numerous attempts have been made and different approaches have been tried, to assure that the water when added will properly combine with the mix ingredients to produce a proper emulsion or batter. Emulsifiers of different types are commonly used in combination with the shortening to aid in producing a proper emulsion or batter when the mix is combined with the water, by bringing the fats into intimate contact with the flour and other ingredients of the batter. Such emulsifiers are commonly provided by combining them with the shortening in a manner well known in the art, to produce an emulsified shortening. Generally, this has resulted in cakes having generally overall good qualities; there is however, a constant effort to improve the cake mix technology so as to overcome disadvantages which still exist in the state of the art as to the methods of producing them, and to improve the resulting cake to a greater extent.

Various methods have been used for making culinary mixes, such as cake mixes. Known processes generally require numerous steps and a vast amount of equipment. For example, in practicing one method, the flour is first dried and then milled so that it has the desired particle size; at the same time, the sugar is ground so that it also has the desired particle size. Shortening, which is to be incorporated in the mix, is prepared by combining it with a suitable emulsifier, and votating it in a manner well known in the art, to produce a suitable shortening. The flour is then combined and blended with all or part of the sugar, and this mixture is then combined and blended with other dry ingredients such as the leavening ingredients, flavoring, etc. Finally, the mixture is combined and blended with the shortening and emulsifier ingredients to provide a blended, free-flowing mix. Such a method requires many steps, much equipment, and a large amount of floor space in the plant.

As indicated, the known methods of preparing culinary mixes have not been entirely satisfactory in many instances, from the standpoint of the method and equipment used, as well as the resulting product. Generally, the methods used depend to some extent on the equipment already available and installed at the production facilities, as well as the type of ingredients used, whether it be granular or powdered sugar, plastic or liquid shortening, whether the shortening is already votated and/or combined with the emulsifier, etc. If granular sugar is used, it may be necessary or desirable to first mill at least part of it into a powdered form; likewise, if plastic shortening is to be combined and blended with flour and sugar, there may be some limitation as to the type of equipment which can be used and still obtain optimum results.

Accordingly, one object of the present invention is to provide an improved method for making a culinary mix.

Another object is to provide a method for making a culinary mix which involves a minimum number of steps and which requires a minimum amount of equipment.

A further object is to provide a method for making a culinary premix in which at least flour and an emulsifier are combined and processed in such a manner that the emulsifier is caused to be distributed about the flour particles.

Still another object is to provide a method for making a culinary premix in which a mixture of flour, sugar, and emulsifier are subjected to impact forces whereby the flour and sugar particles are finely ground and the emulsifier is dispersed about the flour and sugar particles.

Yet another object is to provide a culinary premix which can be used to form a cake mix having optimum volume with respect to the amount of mix used, and improved eating qualities.

Another object is to provide a premix for making a cake, formed from combining flour, sugar and emulsifier and subjecting the resulting mixture to impact forces which cause the emulsifier to be distributed about the flour and sugar particles.

Other objects and advantages of this invention will become apparent from a consideration of the following detailed description of the invention.

Generally, the invention involves preparing a culinary premix comprising flour, emulsifier, and if desired, sugar. The premix is subsequently combined with the other ingredients which form the final mix. The premix ingredients are combined and blended to form a homogeneous mixture which is subjected to impact forces of sufficient magnitude which cause the flour and sugar particles to be finely ground and the emulsifier to be dispersed or distributed about the individual particles. The other ingredients which form the total mix, such as the flavoring and leavening ingredients, shortening, and the like, are thereafter blended with the premix, to form the final mix which is then stored or packaged for ultimate use. It has been discovered that subjecting the premix ingredients to impact forces causes the particles to be finely ground into minute particles which increases the total surface area of the particles upon which the emulsifier is distributed. The emulsifier-covered particles when combined and blended with the shortening and other ingredients, produce an emulsion or batter when the water is added, which makes an excellent product. It has been found that mixes formed by using such a premix, produce a layer cake which possesses the necessary characteristics desired in a good cake.

According to the invention, it has been found that the premix can be formed from flour and emulsifier alone; or it can be formed by including sugar, and even a small amount of shortening, as ingredients of the premix. Generally, it appears that the important step in the method involves the use of impact forces which not only reduce the particle size of the flour and sugar particles, but which also cause the emulsifier to be distributed about the individual particles thereby aiding in ultimately forming a batter having the desired characteristics.

It has been found that a number of impact milling devices can be used for providing the impact forces required in practicing the invention. One type of impact mill which has been used with successful results is a fluid energy mill which utilizes a high velocity fluid medium, such as air and/or steam, for causing the particles to collide and impact against each other, thereby reducing their particle size. When using such a mill, the premix ingredients while suspended in the fluid medium are subjected to attrition by violent impact between the particles. During this impact action, the particles are finely ground, the surface area of the particles is increased, and the emulsifier is distributed about the individual flour and sugar particles so as to at least partially cover the exposed surfaces. A fluid energy mill of the type marketed by the Fluid Energy and Processing Equipment Company under their proprietary name Jet-O-Mizer, and which is disclosed and described in Patent No. 2,590,220, has been used for this purpose with satisfactory results. As used herein, this type of apparatus will also be referred to as a jet mill.

The operation of such mills is generally well known to those skilled in the art; therefore, at this point, no detailed description of the mill will be presented. For purposes of illustration however, a brief description of the operation of such a mill as applied to the present invention will be presented. The material to be subjected to impact forces is admitted into the lower portion of a torus-shaped grinding chamber. A grinding fluid, such as air, steam, or a combination of the two, is also admitted at the lower portion of the chamber through nozzles specifically designed and oriented to operate at specific conditions. The particles are suspended in and carried by the fluid stream, at which time they collide with each other and are caused to disintegrate into minute particles. The smaller or fine particles are subsequently removed from the chamber, while the larger particles are recycled for further impact. The total residence time of the particles within the chamber is normally just a matter of seconds, or fractions of a second.

Preferably, dried, heated air is used as the grinding fluid. The air is admitted to the nozzles at a pressure of about 40–90 p.s.i.g.; at a temperature ranging from about 70° to 700° F., and more specifically 200° to 550° F.; and at a rate of about 200–480 s.c.f.m.; these ranges of course, will depend to some extent on the size of equipment used. The material on the other hand, is admitted into the chamber at a rate of about 200 to 1300 pounds per hour.

By using such a mill, the premix ingredients are blended together within the mill, they are heated to an elevated temperature, they are ground to a fine particle size, and particle size classification is obtained. As to the latter, a narrow range of particle size can be obtained if desired, because particles above a predetermined size can be recycled through the mill for subsequent grinding.

Other types of impact devices which can be effectively used for fine grinding are mechanical impact mills. Generally, such mills are provided with hammers and/or whizzers which impact against the particles so as to cause them to be disintegrated or shattered. Various well known and commercially available impact milling devices can be used. Illustrative of the types which might be used are mills known as Schutz-O'Neill Mill, Raymond Vertical Mill, Strong-Scott Pulvocron, Micro-Pulverizer, Alpine Pin Mill, as well as others. Generally, in such machines a plurality of hammers and/or whizzers are mounted within a grinding chamber in such a manner that the hammers are caused to rotate about a prescribed axis. The material to be pulverized is admitted into the chamber where the particles are accelerated to a high speed by the rotating hammers, and they are rapidly reduced in size by attrition with the hammers and the walls of the grinding chamber. Air having the required velocity, enters the chamber and carries the finely divided material to appropriate classifiers where the particles are separated from the air.

Before proceeding with a detailed description of the methods by which the premix can be made, the basic ingredients which form the premix will be briefly described; such ingredients being flour, sugar, and emulsifier. The remaining ingredients forming the final mix are commercially available and will not be specifically described.

Generally, the flour used can be any of those customarily used in making cake mixes. Preferably, it should be bleached cake flour derived from a soft wheat. Suitable sugars for use comprise any of the commonly used granular sugars including sucrose, dextrose, maltose, fructose, and lactose. Furthermore, if desired, at least a part of the sugar might be used in powdered form. Different kinds of emulsifiers are available which can be used. Representative of such compounds are mono- and diglycerides of fat forming fatty acid, such as mono- and diolein, monostearin, and dipalmitin; polyoxyalkylene ethers of fatty esters of polyhydric alcohols, such as the polyoxyethylene ethers of sorbitan monostearate or the polyoxyethylene ethers of sorbitan distearate; mono- and diesters of glycols and fatty acids such as propylene glycol monostearate; and partial esters of carboxylic acids such as lactic, citric, and tartaric acids with the mono- and diglycerides of fatty acids, such as glyceryl lactopalmitate. The fatty acids used to prepare the above emulsifiers include those derived from beef tallow and castor, coconut, cottonseed, mustard seed, palm, peanut, rapeseed, rice bran, soybean, tall and marine oils. A preferred emulsifier is propylene glycol monostearate.

The specific amount of each ingredient in the premix can vary depending upon the type of product desired, the quality desired, etc. If only flour and emulsifier are used in the premix, the amount of flour might range from 92-99%, and the amount of emulsifier from 1-8%. A preferred amount of each ingredient would be 95.5% flour and 4.5% emulsifier. This premix could then be combined with other ingredients to form a desired culinary mix. If sugar is included in the premix, the amount of flour might vary from 40-55%, the amount of sugar from 10-60%, and the amount of emulsifier from 1-4%. A preferred amount of each ingredient would be 50.4% flour, 47.3% sugar, and 2.3% emulsifier. A number of specific examples are set forth hereinbelow. It should be realized of course, that the above amounts would be less, when based on the total mix ingredients, including the shortening, leavening, etc.

While the overall steps involved in practicing the invention are somewhat the same, it has been found that the individual steps performed can be varied somewhat and that certain variations can be made in the processing operation. The following description describes some of the variations in performing the steps in forming the premix, and ultimately the total mix.

In one method, a premix comprised of flour and emulsifier can be prepared by admitting the flour into a jet mill, while at the same time, a liquid emulsifier is injected or admitted into the mill. The flour particles and liquid emulsifier are subjected to impact forces and as the particles are caused to collide with each other, they become finely ground and the total surface area of the particles is increased. Simultaneously, the emulsifier is caused to be dispersed or distributed about the surface of the individual flour particles. The average particle size of the emulsifier-covered flour particles when discharged from the mill ranges from about 2-15 microns, depending on the operating conditions used. The heated air causes the particles to be dried to a prescribed moisture content. The premix is then admixed and blended with granular or powdered sugar, and if desired, this mixture can be blended with the other ingredients forming the total mix, such as the shortening, leavening, and flavoring. At some stage it may be necessary or desirable to cool the premix to a prescribed temperature range, after it is discharged from the jet mill.

An alternative method to that described above involves using a plastic emulsifier rather than a liquid emulsifier. The plastic emulsifier can either be mixed and blended with the flour particles prior to subjecting the mixture to impact forces, or it can be admitted into the jet mill separately. In any event, when the plastic emulsifier is subjected to the heated air within the grinding chamber, it is caused to melt and become fluid. The emulsifier is then dispersed about the flour particles in the same manner described above. Again, it might be desirable to cool the discharged particles to a predetermined temperature level.

It should be realized of course that the conditions under which the jet mill will be operated will vary somewhat depending upon the type of materials admitted into it. For example, if a plastic emulsifier is used, the air should preferably have a higher temperature than if a liquid emulsifier is used, because the air must be hot enough to melt the plastic emulsifier to a fluid state. Moreover, if cooling of the premix is desired, less energy is required to cool a premix which has been formed by using a liquid emulsifier rather than a plastic emulsifier, because of the higher temperatures required to melt the plastic emulsifier.

While the above methods have been described in connection with a jet mill, such methods might just as readily be carried out by using an impact mill, such as a Schutz-O'Neill Mill or a Raymond Mill. In other words, flour and a liquid emulsifier (which might be preheated to a desired temperature range if desired) might be admitted into the grinding chamber with the result that the impact forces cause the particles to be finely ground and the emulsifier to be distributed about the flour particles. If a plastic emulsifier is admitted into the grinding chamber in lieu of a liquid emulsifier, heated air should be directed into the grinding chamber in order to melt the plastic emulsifier. If heated air is used, the particles are dried to a desired moisture level during the impact step.

Another method involves making a premix comprised of flour, sugar, and emulsifier. In practicing this variation, the flour, sugar, and if desired, the emulsifier, are combined and blended to form a homogeneous mixture. The mixture is then admitted into an impact mill, such as a jet mill, where the particles and the emulsifier are subjected to impact forces. In this regard, it might be preferred to admit the ingredients separately into the mill and rely on the forces within the mill for blending the ingredients together. While in the mill, both the flour particles and the sugar particles are finely ground and the emulsifier is dispersed about the individual particles. Since sugar, especially granular sugar, has a higher density than flour and normally the particles are larger than the flour particles, it is reduced in particle size to a greater extent than the flour particles which are already relatively small in size. If desired, the emulsifier might be admitted directly into the mill either in plastic or liquid form rather than including it in the blended mixture. Moreover, it might be preferred to use an impact mill such as the Raymond Mill in lieu of a jet mill. When such an apparatus is used however, it might be necessary to admit heated air into the grinding chamber for melting the emulsifier if it is in a plastic state, and/or drying the resulting premix. On the other hand, a heated liquid emulsifier might be injected into the grinding chamber thus eliminating the requirement for heated air to melt the emulsifier, although it might be provided for other purposes, e.g. drying. The premix when discharged from the mill is then processed further by cooling it if desired, combining it with other ingredients of the mix, and/or storing it for subsequent processing.

It has also been discovered that the premix which is prepared might contain a certain amount of shortening as one of the ingredients. In this regard, layer cakes normally include shortening which ranges from about 6-20% of the total mix. Thus, a premix comprised of flour, sugar, emulsifier and at least part of the shortening can be subjected to impact forces of sufficient magnitude to cause the flour and sugar particles to be finely ground and the emulsifier and shortening to be dispersed about the individual particles. Preferably, the amount of shortening included in the premix should constitute less than 10% of the premix. It has been found that if too much shortening is included in the premix, there may be a tendency for the mixture to form undesirable lumps and the resulting premix, mix, batter and product may not possess the optimum qualities. Moreover, if desired, an emulsified shortening might be used in lieu of shortening and emulsifier separately. In most respects, a premix which includes shortening can be produced utilizing substantially the same methods and equipment described above. In other words, the emulsifier might be provided in either a liquid or plastic state, and the shortening might likewise be provided in either a liquid or plastic state.

Numerous cake mixes can be made according to the present invention. The following specific examples illustrate cake mixes prepared according to the present invention:

EXAMPLE I

A white cake mix was prepared from the following ingredients.

| Ingredients: | Percent by weight |
|---|---|
| Flour—cake | 41.20 |
| Sugar—powdered | 38.60 |
| Shortening—plastic | 7.77 |
| Leavening | 3.22 |
| Nonfat milk solids | 3.22 |
| Propylene glycol monostearate—plastic | 1.92 |
| Corn syrup solids | 1.92 |
| Wheat starch | 0.96 |
| Salt | 0.63 |
| Lecithin | 0.37 |
| Vanilla | 0.19 |

A premix was prepared by admitting flour particles and a plastic emulsifier into a jet mill chamber at a feed rate of about 340 pounds per hour. Heated air, having a temperature of about 410° F. was also introduced through appropriate nozzles at a pressure of about 70 p.s.i.g., and at a rate of about 450 s.c.f.m. While in the grinding chamber, the mixture was subjected to impact forces, caused by the particles colliding with each other, to such an extent that the flour particles were finely ground and the emulsifier was distributed about the individual particles. The resulting average particle size of the flour ranged from about 3–15 microns; the temperature of the impacted mixture when discharged was about 170° F.; and it had a moisture content of about 3%. The premix was then cooled to a temperature of about 100° F. by agitating it in a ribbon blender, from which it was conveyed to another ribbon blender. The remaining ingredients, including the sugar, starch, leavening, etc., were also admitted into the ribbon blender where they were intimately mixed and blended with the premix. The plastic shortening was also admitted into the blender, and it was blended with the other ingredients to form the final mix. In this regard, a shortening was used which did not contain any emulsifiers. After being discharged from the blender, the mix was processed in a cake mix finisher and conveyed to appropriate packaging equipment for packaging into predetermined amounts.

A cake was prepared by combining and blending 540 grams of the above mix with 360 milliliters of water and the whites of two eggs to form a homogeneous batter or emulsion. The resulting batter was poured into two 8 inch cake tins, and baked at a temperature of 350° F. for about 30 minutes. The resulting cake exhibited excellent characteristics as to volume, crust, tenderness, color, moistness, and the like.

EXAMPLE II

A yellow cake mix was prepared from the following ingredients.

| Ingredients: | Percent by weight |
|---|---|
| Flour—cake | 41.10 |
| Sugar—granular | 38.49 |
| Shortening—plastic | 8.00 |
| Invert sugar syrup | 3.96 |
| Leavening | 2.57 |
| Nonfat milk solids | 1.50 |
| Propylene glycol monostearate—plastic | 1.47 |
| Pregelatinized corn starch | 1.00 |
| Corn syrup solids | 0.92 |
| Salt | 0.63 |
| Vanilla | 0.30 |
| Colorant | 0.06 |

A premix was prepared by combining the flour, sugar, invert sugar syrup, and plastic emulsifier and blending them together in a ribbon blender until a homogeneous mixture was formed. The mixture was fed into a Raymond Mill having a 3–12 whizzer setting, at a feed rate of about 600 pounds per hour. A steam heater was affixed to the grinder to heat the air pulled into the mill to about 300° F. so as to melt the emulsifier and dry the premix. The hammers within the mill caused the flour and sugar particles to be finely ground to an average particle size ranging from about 3–15 microns, and the emulsifier to be dispersed about the individual particles. The impacted mixture was discharged from the mill at a temperature of about 150° F. The remaining ingredients including the plastic shortening and minor ingredients were combined with the premix and blended in a ribbon blender in substantially the same manner as described above in conjunction with Example I, to form a cake mix which was then packaged into predetermined amounts.

EXAMPLE III

A chocolate cake mix was prepared from the following ingredients.

| Ingredients: | Percent by weight |
|---|---|
| Sugar—granular | 33.62 |
| Flour—cake | 33.50 |
| Shortening—liquid | 8.00 |
| Dried corn syrup solids | 8.00 |
| Cocoa | 6.00 |
| Invert sugar syrup | 4.00 |
| Propylene glycol monostearate | 2.00 |
| Nonfat milk solids | 1.50 |
| Leavening | 1.40 |
| Pregelatinized corn starch | 1.00 |
| Salt | 0.88 |
| Vanilla | 0.10 |

A premix was prepared by combining and blending the flour, sugar and invert sugar syrup together in a ribbon blender to form a homogeneous mixture. The resulting mixture was introduced into a jet mill at a feed rate of about 750 pounds per hour, and a liquid emulsifier was simultaneously injected into the jet mill. Heated air, having a temperature of about 280° F. was introduced into the grinding chamber through appropriate nozzles at a pressure of about 70 p.s.i.g., and at a rate of about 450 s.c.f.m. The flour and sugar particles were finely ground within the grinding chamber and the liquid emulsifier was distributed about the individual particles. The resulting mixture, which had a temperature of about 140° F. when discharged from the grinding chamber, was cooled to about 100° F. by agitating it in a ribbon blender. It was then combined and blended with the minor ingredients and a liquid shortening in a high speed mixer to form a mix which was then packaged for future use.

The above specific examples illustrate three types of cake mixes prepared by somewhat different methods. While the ingredients can be varied to produce a wide variety of products, it should be recognized that the basic method of forming the premix is substantially the same, in that the emulsifier is dispersed about the individual particles. It should be pointed out that if desired, a single premix formed of flour, sugar and emulsifier in appropriate proportions, might be prepared which could be used for making a variety of cakes, e.g. white, yellow, and others. By impact milling the flour and sugar particles with an emulsifier, the ingredients are blended together to form a mixture, they are finely ground to a desired average particle size range, and the mixture is heated so as to dry the particles and aid in causing the emulsifier to be distributed about the particles. It must be recognized that the various steps involved in practicing the invention can be varied in ways other than specifically set forth in the above examples, for example, as set forth generally hereinbefore.

In the above description, a disclosure of the principles of this invention is presented, together with some specific examples by which the invention may be carried out.

Now therefore, we claim:

1. A method for making a culinary premix which comprises subjecting a mixture of flour particles, sugar particles, and a fluid emulsifier to impact forces which causes said flour and sugar particles to become finely ground and the emulsifier to be distributed about the individual flour and sugar particles, the average particle size of said flour particles being reduced to a range of about 2–15 microns.

2. The method of claim 1 wherein the mixture is comprised of about 10–60 percent sugar, about 40–55 percent flour, and about 1–4 percent emulsifier.

3. The method of claim 1 wherein the emulsifier is propylene glycol monostearate.

4. The method of claim 1 which includes combining and admixing additional sugar particles with the emulsifier-covered flour and sugar particles thereby forming said premix.

5. A method for making a culinary mix containing at least flour, sugar, shortening, and emulsifier, which comprises combining and admixing said flour and sugar with a plasticized emulsifier thereby forming a homogeneous mixture, heating said mixture and subjecting it to impact forces which cause the flour and sugar to be finely ground and the emulsifier to melt and be distributed about the individual flour and sugar particles, cooling the resulting mixture, and combining and admixing the cooled mixture with the shortening.

6. The method of claim 5 wherein a plasticized shortening is combined and admixed with said cooled mixture.

7. The method of claim 5 wherein a liquid shortening is combined and admixed with said cooled mixture.

8. The method of claim 5 wherein a portion of the shortening contained in the culinary mix is combined and admixed with the flour, sugar, and emulsifier mixture prior to subjecting the mixture to impact forces, said emulsifier and shortening becoming dispersed about the individual flour and sugar particles while said particles are subjected to impact forces, the remaining portion of said shortening being combined and admixed with the mixture after it has been subjected to impact forces.

9. A method for making a culinary mix containing at least flour, sugar, shortening, and emulsifier, which comprises combining and admixing said flour and sugar to form a homogeneous mixture, subjecting said mixture to impact forces which cause the flour and sugar to be finely ground, adding a heated liquid emulsifier to said mixture while said mixture is being subjected to impact, said emulsifier being dispersed about the individual flour and sugar particle, cooling the resulting mixture, and combining and admixing the cooled mixture with the shortening.

10. A method for making a culinary mix from a plurality of ingredients which comprises admitting flour particles, sugar particles, and an emulsifier into an impact mill, blending said particles and emulsifier together while in said mill, subjecting said particles and emulsifier to heat while in the mill, grinding said particles by subjecting them to impact forces which cause the particles to be finely ground and the emulsifier to be distributed about the individual flour and sugar particles, the heat causing the particles to be dried and the emulsifier to be distributed about the particles, cooling said mixture, and combining and admixing the mixture with shortening and other ingredients forming the culinary mix.

11. A method for making a culinary premix which comprises introducing flour particles and emulsifier into a fluid energy mill supplied with a stream of dry gas at a temperature from about 70° to 700° F. as the energizing fluid, subjecting said flour particles and emulsifier to treatment within said mill to effect drying and grinding of the flour particles to an average particle size ranging from about 2–15 microns by suspending said flour particles and emulsifier in the gaseous stream thereby subjecting said particles to attrition by violent impact between said particles, and causing the emulsifier to be dispersed about the flour particles.

12. A method for making a culinary premix which comprises subjecting a mixture of flour particles and a fluid emulsifier to impact forces in a fluid energy mill which cause said flour particles to become finely ground and the emulsifier to be distributed about the individual flour particles.

13. A method for making a culinary premix which comprises combining a mixture of flour particles and a plastic emulsifier together, heating said particles and emulsifier thereby drying said particles, fluidizing said emulsifier, an aiding in distributing said emulsifier about said flour particles, subjecting said mixture to impact forces which cause said flour particles to become finely ground and the emulsifier to be distributed about the individual flour particles.

14. The method of claim 13 wherein sugar is combined and blended with the flour and emulsifier, said flour and sugar being finely ground and the emulsifier being dispersed about both the individual flour and sugar particles.

References Cited

UNITED STATES PATENTS 2,874,052  2/1959  Bedenk _____ 99—94

FOREIGN PATENTS 699,657  12/1964  Canada.

RAYMOND N. JONES, Primary Examiner